US012739738B2

(12) United States Patent
Liu

(10) Patent No.: US 12,739,738 B2
(45) Date of Patent: Sep. 15, 2026

(54) NETWORK SELECTION METHOD AND APPARATUS, DEVICE AND STORAGE MEDIUM

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 917 days.

(21) Appl. No.: 18/154,376

(22) Filed: Jan. 13, 2023

(65) Prior Publication Data

US 2023/0171686 A1 Jun. 1, 2023

Related U.S. Application Data

(63) Continuation of application No. PCT/CN2020/108520, filed on Aug. 11, 2020.

(51) Int. Cl.
*H04W 48/18* (2009.01)
*H04W 8/12* (2009.01)

(52) U.S. Cl.
CPC ............. *H04W 48/18* (2013.01); *H04W 8/12* (2013.01)

(58) Field of Classification Search
CPC ... H04W 48/18; H04W 84/042; H04W 48/16; H04W 48/08; H04W 60/00; H04W 8/12; H04W 8/24; H04W 60/04
See application file for complete search history.

(56) References Cited

U.S. PATENT DOCUMENTS

2020/0245235 A1* 7/2020 Chun .................... H04W 48/18
2022/0046530 A1* 2/2022 Lai ........................ H04W 48/18

FOREIGN PATENT DOCUMENTS

CN 105530684 A 4/2016
CN 107241694 A 10/2017
CN 110213808 A 9/2019
CN 111278084 A 6/2020
(Continued)

OTHER PUBLICATIONS

The EESR of corresponding European application No. 20948992.1, dated Jun. 20, 2023.
(Continued)

*Primary Examiner* — Marcus Hammonds
(74) *Attorney, Agent, or Firm* — Ladas & Parry LLP

(57) ABSTRACT

Embodiments of the present application provide a network selection method and apparatus, a device, and a storage medium, and relate to the field of communication technologies. The method includes: determining, by a terminal device, current location information of the terminal device; selecting, by the terminal device, a selection parameter corresponding to the current location information from a selection parameter set, where the selection parameter set includes a corresponding relationship between the location information and the selection parameter, and the selection parameter is used for selecting a PLMN or an NPN; and performing, by the terminal device, network selection according to the selection parameter corresponding to the current location information.

14 Claims, 7 Drawing Sheets

(56) References Cited

FOREIGN PATENT DOCUMENTS

WO 2020102292 A1 5/2020

OTHER PUBLICATIONS

Qualcomm Incorporated, OPPO, Nokia, Nokia Shanghai Bell, Addressing open issues for Solution 2, S2-2004348, 3GPP TSG-SA WG2 Meeting #139e, Elbonia, Jun. 1-Jun. 12, 2020.

3GPP TR 23.700-07 V0.4.0 (Jun. 2020); 3rd Generation Partnership Project; Technical Specification Group Services and System Aspects; Study on enhanced support of non-public networks, (Release 17).

International Search Report (ISR) dated May 10, 2021 for Application No. PCT/CN2020/108520.

Written Opinion (WOSA) dated May 10, 2021 for Application No. PCT/CN2020/108520.

The first Office Action of corresponding European application No. 20948992.1, dated Feb. 26, 2024.

* cited by examiner

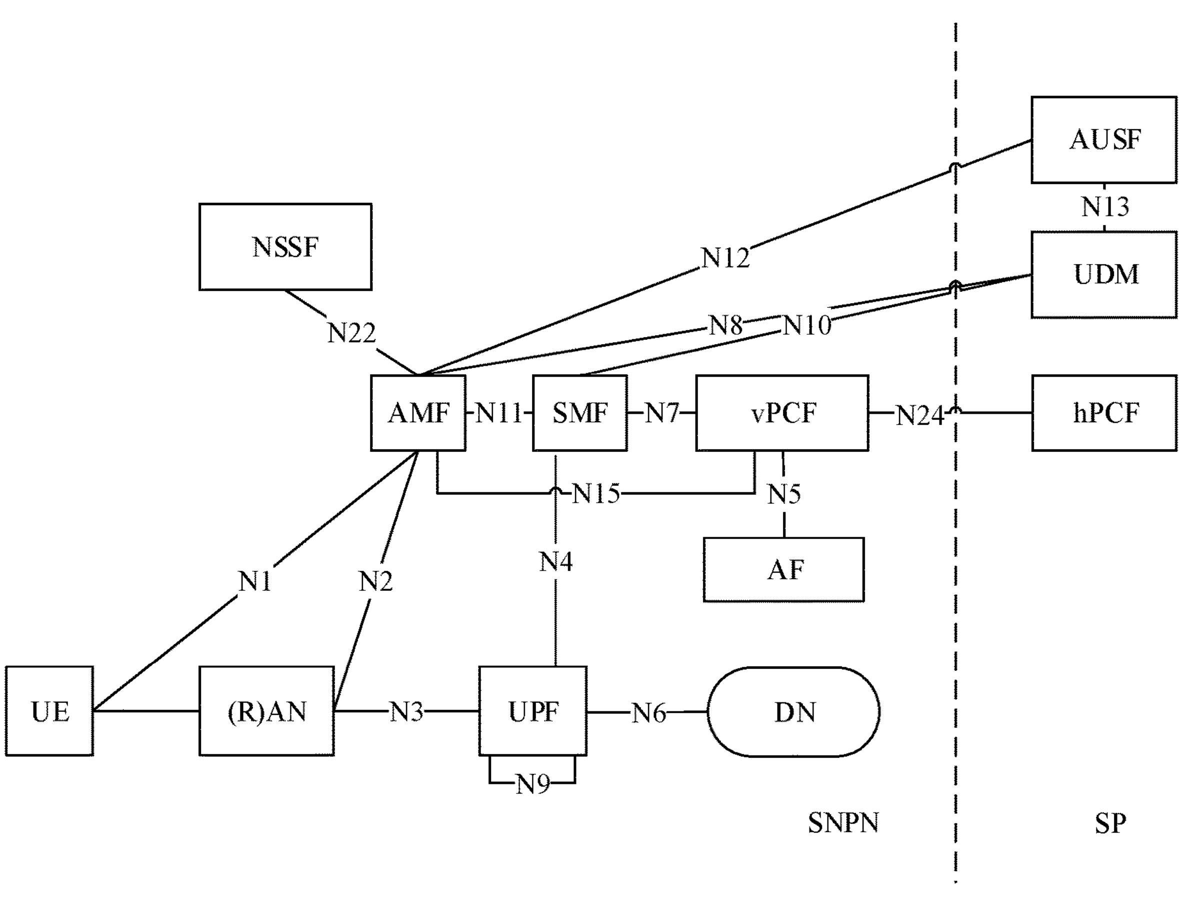

FIG. 2

310: A terminal device determines current location information of the terminal device 320: The terminal device selects, from a selection parameter set, a selection parameter corresponding to the current location information, where the selection parameter set includes a corresponding relationship between the location information and the selection parameter, and the selection parameter is used for selecting a PLMN or an NPN 330: The terminal device performs network selection according to the selection parameter corresponding to the current location information

FIG. 3

Network device 110

Processor

Transceiver

111

112

NETWORK SELECTION METHOD AND APPARATUS, DEVICE AND STORAGE MEDIUM

CROSS-REFERENCE TO RELATED APPLICATIONS

This application is a continuation of International Application No. PCT/CN2020/108520, filed on Aug. 11, 2020, the content of which is incorporated herein by reference in its entirety.

TECHNICAL FIELD

Embodiments of the present application relate to the field of communication technologies, and in particular, to a network selection method and apparatus, a device, and a storage medium.

BACKGROUND

Generally, a terminal device performs data services based on a PLMN (Public Land Mobile Network). However, in some management scenarios with high security or privacy requirements, such as an office scenario, a home scenario, a factory, etc., the data services based on the PLMN may have security risks such as data leakage. Based on this, 3GPP (3rd Generation Partnership Project) has introduced NPN (Non-Public Network).

NPN can provide a closed secure network service independent of the public network, and thus meets needs of vertical industries for a mobile communication private network. Currently, there are two types of NPNs: standalone NPN (SNPN) and public network integrated NPN. The SNPN does not depend on the PLMN and has an independent network element as well as a root key, a security algorithm, subscription information, policy information, etc.; the public network integrated NPN needs to depend on the PLMN and use a network element belonging to the PLMN, etc. At present, a terminal device can access another network through the network it is currently accessing, for example, accessing a different SP (Service Provider) through the NPN, where the SP can be either a PLMN or an NPN.

Further discussion and research are needed on how a terminal device selects a network to accesses.

SUMMARY

The embodiments of the present application provide a network selection method and apparatus, a device, and a storage medium. The technical solution is as follows.

In an aspect, an embodiment of the present application provides a network selection method, applied to a terminal device, and the method includes:

- determining current location information of the terminal device;
- selecting, from a selection parameter set, a selection parameter corresponding to the current location information, where the selection parameter set includes a corresponding relationship between the location information and the selection parameter, and the selection parameter is used for selecting a PLMN or an NPN; and
- performing network selection according to the selection parameter corresponding to the current location information.

In another aspect, an embodiment of the present application provides a network selection method, applied to a network device, and the method includes:

- sending configuration update information to a terminal device, where the configuration update information is used for indicating that a selection parameter set is updated, where the selection parameter set includes a corresponding relationship between location information and a selection parameter, and the selection parameter is used for selecting a PLMN or an NPN.

In a further aspect, an embodiment of the present application provides a network selection apparatus, provided in a terminal device, and the apparatus includes:

- an information determining module, configured to determine current location information of the terminal device;
- a parameter selecting module, configured to select, from a selection parameter set, a selection parameter corresponding to the current location information, where the selection parameter set includes a corresponding relationship between the location information and the selection parameter, and the selection parameter is used for selecting a public land mobile network (PLMN) or a non-public network (NPN); and
- a network selecting module, configured to perform network selection according to the selection parameter corresponding to the current location information.

In yet another aspect, an embodiment of the present application provides a network selection apparatus, provided in a network device, and the apparatus includes:

- an information sending module, configured to send configuration update information to a terminal device, where the configuration update information is used for indicating that a selection parameter set is updated, where the selection parameter set includes a corresponding relationship between location information and a selection parameter, and the selection parameter is used for selecting a public land mobile network (PLMN) or a non-public network (NPN).

In still another aspect, an embodiment of the present application provides a terminal device, and the terminal device includes: a processor, and a transceiver connected to the processor; where

- the processor is configured to determine current location information of the terminal device;
- the processor is further configured to select, from a selection parameter set, a selection parameter corresponding to the current location information, where the selection parameter set includes a corresponding relationship between the location information and the selection parameter, and the selection parameter is used for selecting a public land mobile network (PLMN) or a non-public network (NPN); and
- the processor is further configured to perform network selection according to the selection parameter corresponding to the current location information.

In still another aspect, an embodiment of the present application provides a network device, and the network device includes: a processor, and a transceiver connected to the processor; where

- the transceiver is configured to send configuration update information to a terminal device, where the configuration update information is used for indicating that a selection parameter set has been updated, where the selection parameter set includes a corresponding relationship between location information and a selection parameter, and the selection parameter is used for selecting a public land mobile network (PLMN) or a non-public network (NPN).

In still another aspect, an embodiment of the present application provides a computer readable storage medium, having a computer program stored therein, where the computer program is used to be executed by a processor of a terminal device, to implement the above-mentioned network selection method of the terminal device side.

In still another aspect, an embodiment of the present application provides a computer readable storage medium, having a computer program stored therein, where the computer program is used to be executed by a processor of a network device, to implement the above-mentioned network selection method of the network device side.

In still another aspect, an embodiment of the present application provides a chip, where the chip includes a programmable logic circuit and/or program instructions, and the chip, when running on a terminal device, is configured to implement the above-mentioned network selection method of the terminal device side.

In still another aspect, an embodiment of the present application provides a chip, where the chip includes a programmable logic circuit and/or program instructions, and the chip, when running on a network device, is configured to implement the above-mentioned network selection method of the network device side.

In still another aspect, an embodiment of the present application provides a computer program product, where the computer program product, when run on a terminal device, causes a computer to execute the above-mentioned network selection method of the terminal device side.

In still another aspect, an embodiment of the present application provides a computer program product, where the computer program product, when run on a network device, causes a computer to execute the above-mentioned network selection method of the network device side.

The technical solutions according to the embodiments of the present application may include the following beneficial effects:

the terminal device determines a corresponding selection parameter from a selection parameter set according to current location information, and then performs network selection by using the selection parameter, so that the terminal device flexibly determines the selection parameter for network selection based on its location. Moreover, in the embodiments of the present application, the selection parameter set includes the corresponding relationship between the selection parameter and the location information. Compared with the configuration of a single fixed selection list for the terminal device, which cannot meet the demand of the terminal device for flexible network selection, the embodiments of the present application fully consider the network selection preferences of the terminal device at different locations, realize differential configuration of selection parameters according to different location information, enrich the configuration of selection parameters, and facilitate the terminal device quickly and accurately selecting the network to be accessed.

BRIEF DESCRIPTION OF DRAWINGS

In order to describe the technical solutions in the embodiments of the present application more clearly, the following will briefly introduce drawings that need to be used in the description of the embodiments. Obviously, the drawings described below are merely some embodiments of the present application, and for those skilled in the art, other drawings can be obtained based on these drawings without creative efforts.

FIG. 2 is a schematic diagram of accessing an SP via an SNPN according to an embodiment of the present application.

FIG. 3 is a flowchart of a network selection method according to an embodiment of the present application.

DESCRIPTION OF EMBODIMENTS

In order to make the objectives, technical solutions, and advantages of the present application clearer, the following further describes the embodiments of the present application in detail with reference to the accompanying drawings.

The network architecture and business scenario described in the embodiments of the present application are intended to illustrate the technical solutions of the embodiments of the present application more clearly and does not constitute a limitation to the technical solutions provided by the embodiments of the present application. It is known to those skilled in the art that, with evolution of the network architecture and emergence of new business scenarios, the technical solutions provided by the embodiments of the present application are also applicable to similar technical problems.

Figure 1:
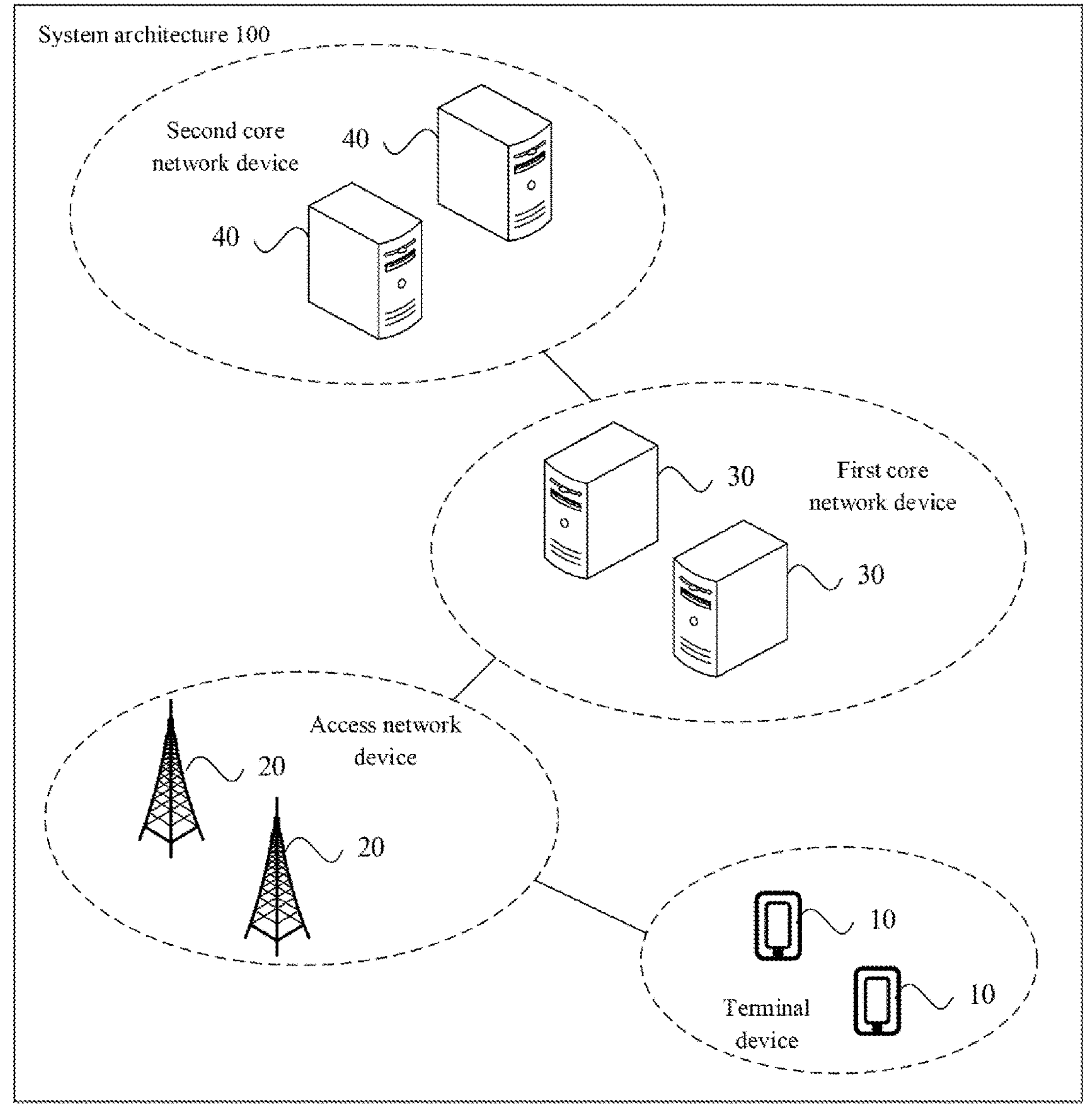
FIG. 1 is a schematic diagram of a system architecture according to an embodiment of the present application.

Referring to FIG. 1, it shows a schematic diagram of a system architecture according to an embodiment of the present application. The system architecture 100 may include: a terminal device 10, an access network device 20, a first core network device 30, and a second core network device 40.

The terminal device 10 may refer to a UE (User Equipment), an access terminal, a user unit, a user station, a mobile station, a mobile terminal, a remote station, a remote terminal, a mobile device, a wireless communication device, a user agent, or a user apparatus. In an implementation, the terminal device may also be a cellular telephone, a cordless telephone, an SIP (Session Initiation Protocol) phone, a WLL (Wireless Local Loop) station, a PDA (Personal Digital Assistant), a handheld device with a wireless communication function, a computing device or other processing devices connected to wireless modems, a vehicle-mounted device, a wearable device, a terminal device in 5G or a terminal device in future evolved PLMN (Public Land Mobile Network), etc., which are not limited by the embodiments of the present application. For the convenience of description, the above mentioned devices are collectively referred to as the terminal device. There are typically a plurality of terminal devices 10, and one or more terminal devices 10 may distribute within a cell managed by each access network device 20.

The access network device 20 is a device deployed in an access network to provide a wireless communication function for the terminal device 10. The access network device 20 may include various forms of macro base stations, micro base stations, repeater stations, access points, etc. In systems using different wireless access technologies, names of the devices with functions of an access network device may vary. For example, in a 5G NR system, the device is called gNodeB or gNB. The name "access network device" may change as the communication technology evolves. For the convenience of description, in the embodiments of the present application, the above-mentioned devices that provide a wireless communication function to the terminal device 10 are collectively referred to as the access network device. In an implementation, through the access network device 20, a communication relationship can be established between the terminal device 10 and the core network device. Illustratively, in an LTE system, the access network device 20 may be an EUTRAN (Evolved Universal Terrestrial Radio Access Network) or one or more eNodeBs in an EUTRAN; in a 5G NR system, the access network device 20 may be an RAN (Radio Access Network) or one or more gNBs in an RAN.

The core network device refers to a device that provides a network service for the terminal device, where the network service may be a PLMN or an NPN, which is not limited in the embodiments of the present application. The function of the core network device is mainly to provide user connection, manage users and complete bearing of business, and serve as a bearer network to provide an interface to an external network. For example, the core network device in a 5G NR system may include an AMF (Access and Mobility Management Function) entity, a UPF (User Plane Function) entity and an SMF (Session Management Function) entity and other devices.

In an example, the access network device 20 and the core network device may communicate with each other via some over-the-air technologies, such as an NG interface in a 5G NR system. The access network device 20 and the terminal device 10 communicate with each other via some over-the-air technologies, such as a Uu interface.

In the embodiments of the present application, the core network device includes a first core network device 30 and a second core network device 40, where the first core network device 30 is used to provide a first network service to the terminal device 10, and the second core network device 40 is used to provide a second network service to the terminal device 10. The present application embodiment does not limit the relationship between the first network service and the second network service, and in an implementation, the first network service and the second network service may be the same type of network service, for example, both being a PLMN or an NPN; or, the first network service and the second network service may be different types of network devices, for example, the first network service being a PLMN and the second network service being an NPN.

In an example, it is assumed that the core network device currently accessed by the terminal device 10 is the first core network device 30, the terminal device 10 may access different SPs through the first core network device 30, that is, accessing different network services through the first core network device 30. Illustratively, the terminal device 10 obtains the first network service through the first core network device 30. For example, the first core network device 30 is a core network device in an SNPN, and the terminal device 10 can access the SNPN through the first core network device 30. Illustratively, the terminal device 10 can access the second core network device 40 through the first core network device 30 and thus can obtain the second network service. For example, the first core network device 30 is a core network device in the SNPN and the second core network device 40 is a core network device in the PLMN, and since the SNPN and the PLMN have their respective core network devices, the terminal device 10 may access the second core network device 40 through the first core network device 30 and then access the PLMN. Illustratively, the terminal device 10 may obtain the second network service through the first core network device 30. For example, the first core network device 30 is a core network device in the PLMN and the second core network device 40 is a core network device in the public network integrated NPN, and since the public network integrated NPN needs to depend on the PLMN, the terminal device 10 may access the public network integrated NPN through the first core network device. Taking the first network service being an SNPN and the second network service being a PLMN as an example, referring to FIG. 2, FIG. 2 illustrates a schematic diagram of a UE accessing an SP via a core network device in an SNPN.

It is can be seen from the above description that, the terminal device can access different network services through the core network device under a certain network service, and in this case, the terminal device needs to determine a network service that is actually to be accessed from at least one network service that can be accessed, that is, the terminal device needs to perform network selection. In order to provide a reference for the terminal device to perform network selection, a selection list is configured for the terminal device in related art, and the terminal device selects a network service in the selection list based on the configured selection list.

In an example, the terminal device is configured with an equivalent home SP list ("Equivalent Home Service Provider" list) and/or an SP controlled network selector list ("Service Provider Controlled Network Selector" list), where the equivalent home SP list includes at least one network that is equivalent to the home SP of the terminal device, and the SP controlled network selector list includes at least one network controlled by the SP. When a network broadcasts an identifier of the network and the identifier of the network is in the configured "Equivalent Home Service Provider" list or "Service Provider Controlled Network Selector" list, the terminal device can select the network.

In another example, the terminal device is also configured with a user-controlled prioritized list and/or a home SP-controlled prioritized list of preferred SNPNs, where the user-controlled prioritized list is used for selecting at least one network controlled by the terminal device; the home SP-controlled prioritized list of preferred SNPNs is used for selecting at least one prioritized network of an SP for an SNPN. When a network broadcasts an identifier of the network and the identifier of the network is in the configured "user-controlled prioritized list" or "Home SP-controlled prioritized list of preferred SNPNs", the terminal device can select the network.

In yet another example, in a case that the SP of the terminal device is a PLMN, the terminal device is also configured with a preference selection value for a network type during roaming, which is used for selecting the preferred selection type of the terminal device for a network when roaming, and the terminal device may preferentially select the PLMN or SNPN based on the preference selection value. In an implementation, the preference selection value is any of the following: PLMN only, SNPN only, PLMN preferred, SNPN preferred.

However, only a set of selection lists is configured for the terminal device in the related art, and the terminal device performs network selection according to the set of selection lists under any circumstances. Therefore, if the terminal device is not in the service area of the home SP, the terminal device will select the NPN of the highest priority as long as the terminal device receives the identifier of the NPN with the highest priority, while if the terminal device is also configured with the selection parameter "PLMN preferred", the terminal device is likely to only select a PLMN for data services, but not select an NPN. It can be seen that, in the related art, the terminal device is configured with a single and fixed selection list, and the terminal device cannot flexibly select a network according to the state of the terminal device. Based on this, the embodiment of the present application provides a network selection method that can be used to solve the technical problems in the related art. The technical solution of the present application is described and illustrated by several illustrative embodiments.

Referring to FIG. 3, it illustrates a flowchart of a network selection method according to an embodiment of the present application. The method can be applied in the system architecture shown in FIG. 1, and the method includes the following steps.

Step 310, a terminal device determines current location information of the terminal device.

The terminal device, in the process of network selection, needs to determine the current location information to facilitate subsequent determination of a selection parameter used for network selection according to the current location information. The current location information is used for indicating the current location of the terminal device, and content of the current location information is not limited in the embodiment of the present application. In an implementation, the current location information includes a current geographic location of the terminal device; or, the current location information includes a country in which the terminal device is currently located; or, the current location information includes an administrative division in which the terminal device is currently located; or, the current location information includes a service cell in which the terminal device is currently located; or, the current location information includes a communication system in which the terminal device is currently located.

In an example, the current location information includes at least one of the following: a geographic location, an MCC (Mobile Country Code). That is, the current location information of the terminal device may include a geographic location and/or an MCC.

The geographic location may be obtained by positioning. In an implementation, the geographic location may be obtained by at least one of the following positioning methods: network positioning method, satellite positioning method, real-time dynamic positioning method or precise point positioning method. The network positioning method refers to the method of positioning based on a network connected to the terminal device, the satellite positioning method refers to the method of positioning based on observation satellite information acquired by the terminal (or also called GPS (Global Positioning System) positioning method), the real-time dynamic positioning method refers to the method of positioning based on differential data acquired by the terminal, and the precise point positioning method refers to the method of positioning based on a precise navigation message acquired by the terminal.

The MCC refers to a mobile country code of the country in which the terminal device is currently located, and the MCC may be sent to the terminal device through a network device corresponding to the network coverage area where the terminal device is currently located. That is, the network device sends a location message to the terminal device, where the location message includes an MCC so that the terminal device knows its current location. In an implementation, the location message sent by the network device is carried in any of the following signaling: a system message, an RRC (Radio Resource Control) dedicated signaling. In an implementation, the network device is the access network device 20 in the embodiment shown in FIG. 1 above.

Step 320, the terminal device selects, from a selection parameter set, a selection parameter corresponding to the current location information, where the selection parameter set includes a corresponding relationship between the location information and the selection parameter, and the selection parameter is used for selecting a PLMN or an NPN.

After determining the current location information, the terminal device may further acquire the selection parameter set, and select the selection parameter corresponding to the current location information from the selection parameter set to facilitate subsequent network selection by using the selection parameter. The selection parameter set includes a corresponding relationship between the location information and the selection parameter. That is, at least one piece of location information is configured in the selection parameter set, and each piece of location information has its corresponding selection parameter. The specific configuration of the selection parameter set is described in the following embodiment and will not be detailed here. The configuration method of the selection parameter set is not limited in the embodiment of the present application. In an implementation, the selection parameter set may be carried in a SIM card of the terminal device. For example, the selection parameter set may be configured and written into the SIM card by an operator, and the terminal device can acquire the selection parameter set by using the SIM card produced by the operator. Or, the selection parameter set may be sent from the network device to the terminal device. For example, the network device may be preconfigured with a selection parameter set, which is then sent to the terminal device through a system message, an RRC dedicated signaling, a NAS (Non-Access Stratum) message, or the like, and the terminal device can acquire the selection parameter set upon receiving the message.

The selection parameter is a basis for the terminal device to perform network selection and can be used to select a PLMN or an NPN. In an example, the selection parameter includes at least one of: a selection parameter for selecting a network equivalent to a home service provider, a selection parameter for selecting a network controlled by a service provider, a selection parameter for selecting a network controlled by a terminal device, a selection parameter for selecting a prioritized network of a home service provider for a SNPN, and a selection parameter for selecting a preferred selection type of a network during roaming. The representation of the selection parameter is not limited in the embodiment of the present application. In an implementation, the selection parameter may be represented in a form of a set. For example, the selection parameter for selecting a network equivalent to a home service provider is expressed as "a set of networks equivalent to a home service provider". Or, the selection parameter may be represented in a form of a list. For example, the selection parameter for selecting a network equivalent to a home service provider is expressed as "a list of networks equivalent to a home service provider". Or, the selection parameter may be represented in a form of a value. For example, the selection parameter for selecting a preferred selection type of a network during roaming is represented as a "preference selection value".

In an example, the selection parameter for selecting a network equivalent to a home service provider includes an "Equivalent Home Service Provider" list, the selection parameter for selecting a network controlled by a service provider includes a "Service Provider Controlled Network Selector" list, the selection parameter for selecting a network controlled by a terminal device includes a user-controlled prioritized list, the selection parameter for selecting a prioritized network of a home service provider for a SNPN includes a Home SP-controlled prioritized list of preferred SNPNs, and the selection parameter for selecting a preferred selection type of a network during roaming includes a preference selection value of a network type during roaming.

Step 330, the terminal device performs network selection according to the selection parameter corresponding to the current location information.

After determining the selection parameter corresponding to the current location information, the terminal device may perform network selection based on the selection parameter corresponding to the current location information. Since the terminal device is mobile, its possible location information has a certain degree of uncertainty, so the selection parameter set may not include the selection parameter corresponding to the current location information of the terminal device. Considering this case, in an example, after the above step 310, the method further includes: in a case that the selection parameter set does not include the current location information, the terminal device selects a selection parameter corresponding to default location information from the selection parameter set; and performs network selection according to the selection parameter corresponding to the default location information. That is, the selection parameter corresponding to the default location information may be configured in the selection parameter set, and in a case that the terminal device cannot find the selection parameter corresponding to its current location information from the selection parameter set, the terminal device uses the selection parameter corresponding to the default location information to perform network selection. For the process of the terminal device performing network selection according to the selection parameter, reference may be made to the description of the above-mentioned embodiment, which will not be described in detail herein.

Figure 4:
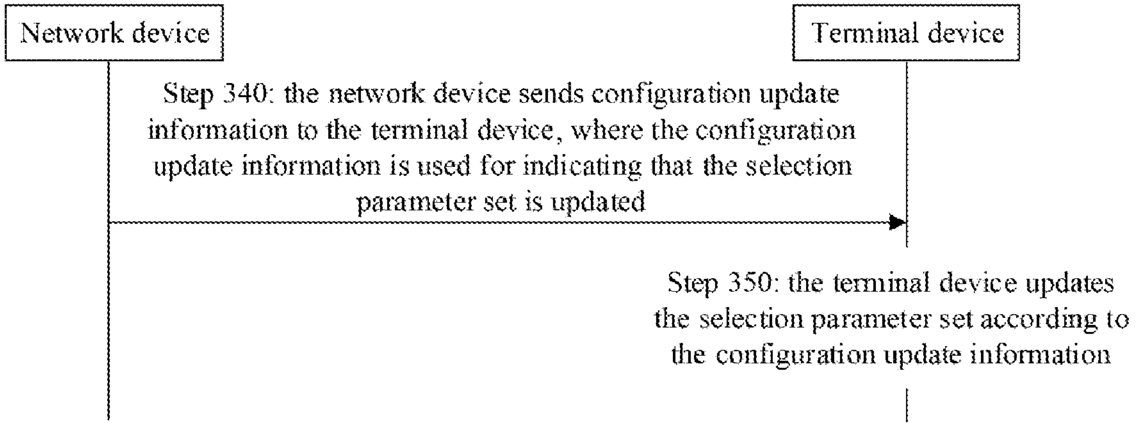
FIG. 4 is a flowchart of a method of updating a selection parameter set according to an embodiment of the present application.

With the advancement of time and technology, the network that the terminal device can access or the selection parameter that the terminal device can use may also change. For example, the terminal device may support access to a new network type, or the terminal device may use a new selection parameter corresponding to the location information of the terminal device, or the terminal device may use a new selection parameter item when performing network selection, or the terminal device may access more networks of a certain network type provided by a network service provider. For example, the terminal device may originally access PLMN 1 and PLMN 2, but subsequently, the terminal device may also access PLMN 3. In order to enable the terminal device to adjust the selection parameter set in time according to these changes, and avoid the subsequent failure to use a new selection parameter or access a new network type, in an example, referring to FIG. 4, the above method further includes the following steps:

Step 340, the network device sends configuration update information to the terminal device, where the configuration update information is used for indicating that the selection parameter set is updated.

Since the terminal device has been already turned on and in use, generally, if the SIM card in the terminal device is not replaced, new configuration information cannot be written into the SIM card. In order to timely notify the terminal device to update the selection parameter set, in the embodiment of the present application, the configuration update information may be sent by the network device to the terminal device to indicate that the selection parameter set has been updated, and then the terminal device may update the selection parameter set according to the configuration update information. In an implementation, the network device is a core network device corresponding to a network service currently accessed by the terminal device, such as an AMF or an SMF, and then the configuration update information may be carried in a NAS signaling. In an implementation, the configuration update information includes updated content of the selection parameter set, so that the terminal device knows the content of the parameter set that has changed.

Step 350, the terminal device updates the selection parameter set according to the configuration update information.

Upon receiving the configuration update information, the terminal device may update the selection parameter set. In an implementation, the configuration update information includes the update content of the selection parameter set, and then, the terminal device parses the configuration update information after receiving the configuration update information to acquire the update content, and adds or deletes the selection parameter or location information in the selection parameter set according to the update content.

In summary, in the technical solution according to the embodiment of the present application, the terminal device determines a corresponding selection parameter from a selection parameter set according to current location information, and then performs network selection by using the selection parameter, so that the terminal device flexibly determines the selection parameter based on its location to perform network selection. Moreover, in the embodiments of the present application, the selection parameter set includes the corresponding relationship between the selection parameter and the location information. Compared with the configuration of a single fixed selection list for the terminal device, which cannot meet the demand of the terminal device for flexible network selection, the embodiment of the present application fully considers the network selection preferences of the terminal device at different locations, realizes differential configuration of selection parameters according to different location information, enriches the configuration of selection parameters, and facilitates the terminal device quickly and accurately selecting the network that needs to be accessed.

In addition, in the technical solution according to the embodiment of the present application, in a case that the selection parameter set is updated, the network device sends configuration update information to the terminal device, to notify the terminal device to update the selection parameter set in time, thereby avoiding the subsequent failure to use a new selection parameter or access a new network type. The embodiment of the present application fully considers changes that the terminal device may encounter in the process of network selection, which helps the terminal device effectively determine the selection parameter according to the differentiation of location information in long-term.

The following description is provided for a configuration method of the selection parameter set.

In an example, the selection parameter set includes n subsets, where n is a positive integer; and an i-th subset of the n subsets includes a corresponding relationship between an i-th piece of location information and at least one selection parameter, where i is a positive integer less than or equal to n.

The selection parameter set may be divided into multiple subsets by different location information. Assuming that there are n pieces of location information, then the selection parameter set also includes n subsets, where n is a positive integer. For the i-th subset of the n subsets, where i is a positive integer less than or equal to n, its corresponding location information is the i-th piece of location information, then the i-th subset includes: the corresponding relationship between the i-th piece of location information and at least one selection parameter. For two different subsets, the items of selection parameters they contain may be the same or different. For example, the i-th subset includes s selection parameters, where s is a positive integer, and the (i+1)-th subset includes t selections parameter, where t is a positive integer, then s may be equal to t, or may not be equal to t, which is not limited in the embodiment of the present application. For the subsets including a same selection parameter, the content of the selection parameter may be the same or different in different subsets. For example, the i-th subset includes the preference selection value of "SNPN only" for the network type during roaming, while the preference selection value of the network type during roaming included in the (i+1)-th subset may be "SNPN only" or "PLMN only".

Figure 5:
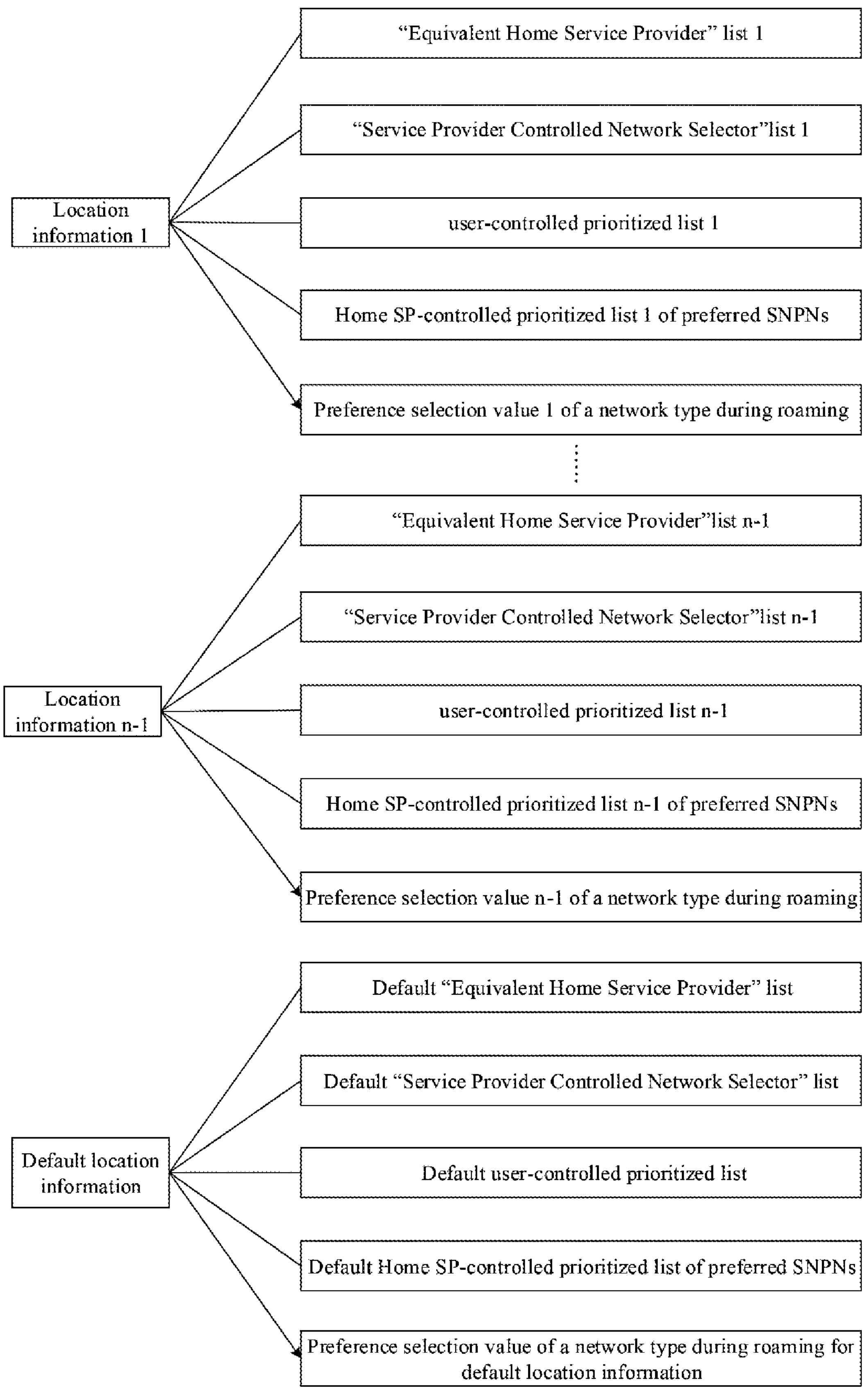
FIG. 5 is a schematic diagram of a method of configuring a selection parameter set according to an embodiment of the present application.

For example, as shown in FIG. 5, it is assumed that n pieces of location information include location information 1 to location information n−1 and default location information, each piece of location information corresponds to the same five selection parameters ("Equivalent Home Service Provider" list, "Service Provider Controlled Network Selector" list, user-controlled prioritized list, Home SP-controlled prioritized list of preferred SNPNs, preference selection value of a network type during roaming).

The selection parameters corresponding to the location information 1 include: "Equivalent Home Service Provider" list 1, "Service Provider Controlled Network Selector" list 1, user-controlled prioritized list 1, Home SP-controlled prioritized list 1 of preferred SNPNs, and preference selection value 1 for a network type during roaming. The selection parameters corresponding to the location information n−1 include: "Equivalent Home Service Provider" list n−1, "Service Provider Controlled Network Selector" list n−1, user-controlled prioritized list n−1, Home SP-controlled prioritized list n−1 of preferred SNPNs, preference selection value n−1 for a network type during roaming. The selection parameters corresponding to the default location information include: default "Equivalent Home Service Provider" list, default "Service Provider Controlled Network Selector" list, default user-controlled prioritized list, default Home SP-controlled prioritized list of preferred SNPNs, and default preference selection value of a network type during roaming.

The content of the same selection parameter may be the same or different in different subsets. For example, the preference selection value 1 of a network type during roaming corresponding to the location information 1 may be "SNPN only", the preference selection value n−1 of a network type during roaming corresponding to the location information n−1 may be "PLMN only", and the default preference selection value of a network type during roaming corresponding to the default location information may be "PLMN preferred".

In an example, when the current location information of the terminal device is the location information 1, it performs selection using the selection parameters corresponding to the location information 1 ("Equivalent Home Service Provider" list 1, "Service Provider Controlled Network Selector" list 1, user-controlled prioritized list 1, Home SP-controlled prioritized list 1 of preferred SNPNs, and preference selection value 1 for a network type during roaming). When the current location information of the terminal device is not in location information 1 to location information n−1, the terminal device performs network selection using the selection parameters corresponding to the default location information (default "Equivalent Home Service Provider" list, default "Service Provider Controlled Network Selector" list, default user-controlled prioritized list, default Home SP-controlled prioritized list of preferred SNPNs, default preference selection value of a network type during roaming).

In another example, the selection parameter set includes m subsets, where m is a positive integer; and a k-th subset of the m subsets includes: a corresponding relationship between the k-th selection parameter and at least one piece of location information, where k is a positive integer less than or equal to m.

The selection parameter set may also be divided into multiple subsets by different kinds of selection parameter items. Assuming that there are m selection parameter items, then the selection parameter set also includes m subsets, where m is a positive integer. For a k-th subset in the m subsets, where k is a positive integer less than or equal to m, its corresponding selection parameter item is the k-th selection parameter, then the k-th subset includes: a corresponding relationship between the k-th selection parameter and at least one piece of location information. For two different subsets, the number of pieces of location information they include may be the same or different. For example, the k-th subset includes x pieces of location information, where x is a positive integer; the (k+1)-th subset includes y pieces of location information, where y is a positive integer, then x may be equal to y or not equal to y, which is not limited in the embodiment of the present application. For a certain subset, the content of the selection parameter item included in the subset may be the same or different. For example, the k-th subset includes the preference selection value of the network type during roaming corresponding to the location information x and the preference selection value of the network type during roaming corresponding to the location information y. The preference selection value of the network type during roaming corresponding to the location information x may be "SNPN only", and the preference selection value of the network type during roaming corresponding to the location information y may be "SNPN only" or "PLMN only".

Figure 6:
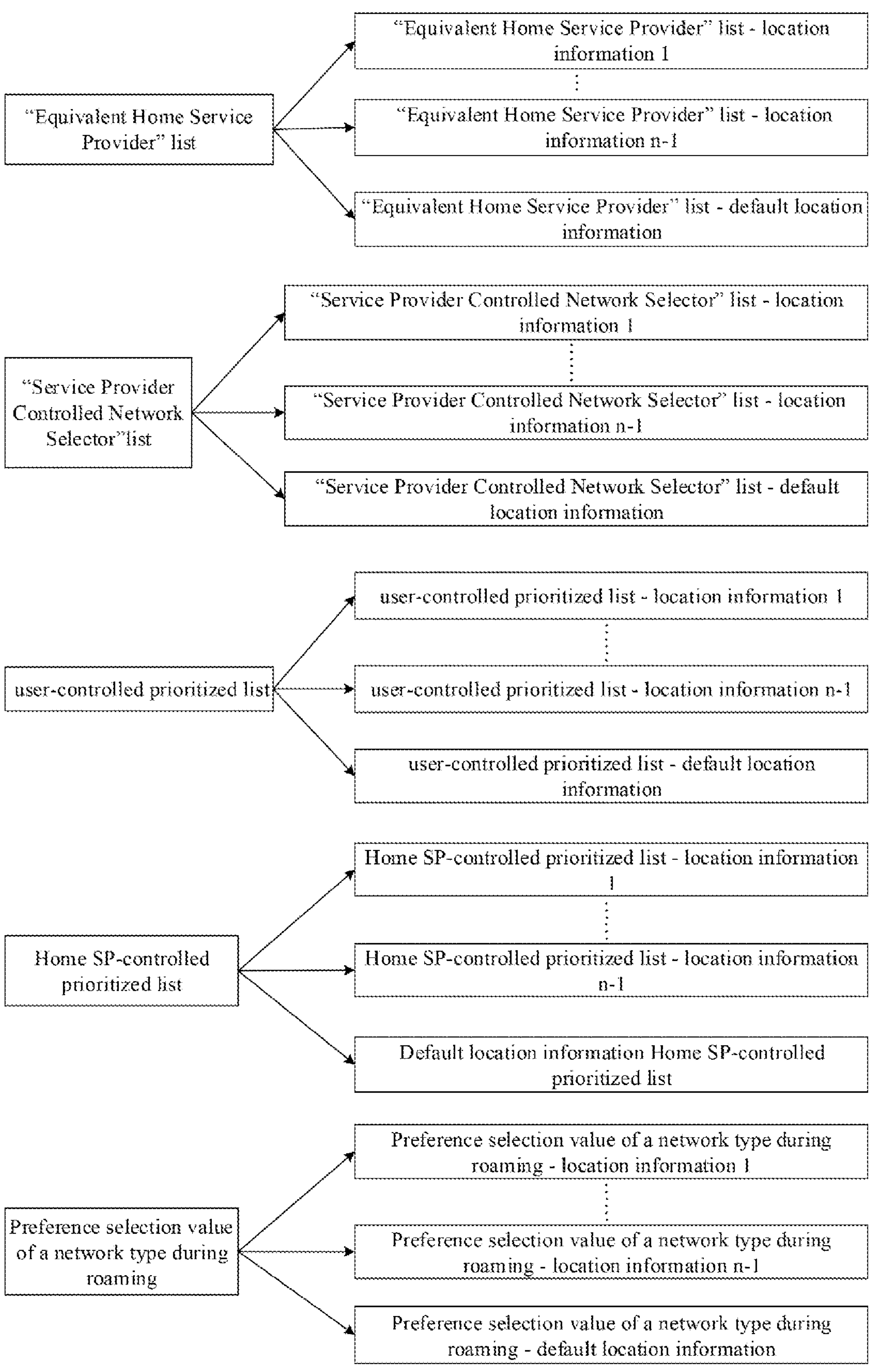
FIG. 6 is a schematic diagram of a method of configuring a selection parameter set according to another embodiment of the present application.

For example, as shown in FIG. 6, it is assumed that the value of m is 5, and the five selection parameters are: the "Equivalent Home Service Provider" list, the "Service Provider Controlled Network Selector" list, the user-controlled prioritized list, the Home SP-controlled prioritized list of preferred SNPNs, and the preference selection value of a network type during roaming. The location information corresponding to each selection parameter item is location information 1 to location information n−1 and default location information, where n is a positive integer.

The "Equivalent Home Service Provider" list includes: "Equivalent Home Service Provider" list—location information 1 to "Equivalent Home Service Provider" list—location information n−1, and "Equivalent Home Service Provider" list—default location information. The "Service Provider Controlled Network Selector" list includes: "Service Provider Controlled Network Selector" list—location information 1 to "Service Provider Controlled Network Selector" list—location information n−1, and "Service Provider Controlled Network Selector" list—default location information. The user-controlled prioritized list includes: user-controlled prioritized list—location information 1 to user-controlled prioritized list—location information n−1, and user-controlled prioritized list—default location information. The Home SP-controlled prioritized list of preferred SNPNs includes: Home SP-controlled prioritized list of preferred SNPNs—location information 1 to Home SP-controlled prioritized list of preferred SNPNs—location information n−1, and Home SP-controlled prioritized list of preferred SNPNs—default location information. The preference selection value of a network type during roaming includes: preference selection value of a network type during roaming—location information 1 to preference selection value of a network type during roaming—location information n−1, and preference selection value of a network type during roaming—default location information.

The content of the same selection parameter may be or may not be the same for different location information. For example, for the preference selection value of the network type during roaming, the preference selection value of the network type during roaming for the location information 1 is "SNPN only", the preference selection value of the network type during roaming for the location information n−1 is "PLMN only", and the preference selection value of the network type during roaming for the default location information is "SNPN only".

In an example, when the current location information of the terminal device is the location information 1, it performs network selection using the selection parameters corresponding to the location information 1 ("Equivalent Home Service Provider" list—location information 1, "Service Provider Controlled Network Selector" list—location information 1, user-controlled prioritized list—location information 1, Home SP-controlled prioritized list of preferred SNPNs—location information 1, and preference selection value for a network type during roaming—location information 1). When the current location information of the terminal device is not in the location information 1 to the location information n−1, the terminal device performs network selection using the selection parameters corresponding to the default location information ("Equivalent Home Service Provider" list—default location information, "Service Provider Controlled Network Selector" list—default location information, user-controlled prioritized list—default location information, Home SP-controlled prioritized list of preferred SNPNs—default location information, preference selection value of a network type during roaming—default location information).

In summary, the technical solution according to the embodiment of the present application enhances the configuration flexibility of the selection parameter set by providing different reference factors to configure the selection parameter set. The case that the selection parameter set is configured by different location information is convenient for the terminal device to quickly find the corresponding selection parameter according to the current location information, so that the speed of the terminal device to determine the selection parameter to be used is improved. The case that the selection parameter set is configured by different types of selection parameter items is convenient for the terminal device to accurately and quickly find the actually used selection parameter according to the selection parameter item that needs to be used and the current location information, thereby avoiding the terminal device from acquiring parameter items that do not need to be used, and improving the accuracy of the terminal device in determining the selection parameter to be used.

It should be noted that in the above method embodiments, the network selection method according to the present application is described and illustrated mainly from the perspective of interaction between the terminal device and the network device. The above-mentioned steps performed by the terminal device may be implemented separately as a network selection method of the terminal device side, and the above-mentioned steps performed by the network device may be implemented separately as a network selection method of the network device side.

The following are apparatus embodiments of the present application, which can be used to execute the method embodiments of the present application. For details not disclosed in the apparatus embodiments of the present application, please refer to the method embodiments of the present application.

Figure 7:
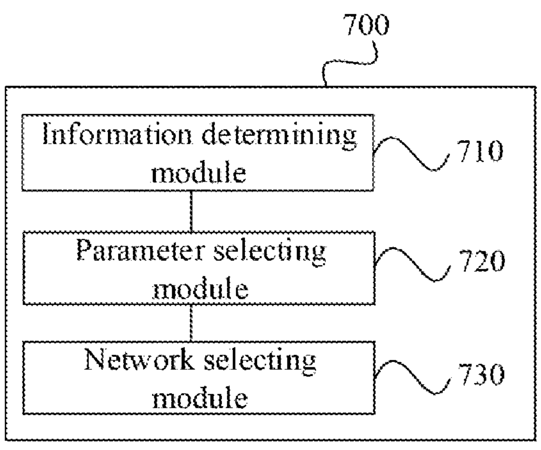
FIG. 7 is a block diagram of a network selection apparatus according to an embodiment of the present application.

Referring to FIG. 7, it shows a block diagram of a network selection apparatus according to an embodiment of the present application. The apparatus has functions of implementing the above-mentioned method examples of the terminal device side, and the functions may be implemented by hardware, or by executing corresponding software in hardware. The apparatus may be a terminal device as described above, or may be provided in a terminal device. As shown in FIG. 7, the apparatus 700 may include: an information determining module 710, a parameter selecting module 720, and a network selecting module 730.

The information determining module 710 is configured to determine current location information of the terminal device.

The parameter selecting module 720 is configured to select, from a selection parameter set, a selection parameter corresponding to the current location information, where the selection parameter set includes a corresponding relationship between the location information and the selection parameter, and the selection parameter is used for selecting a PLMN or an NPN.

The network selecting module 730 is configured to perform network selection according to the selection parameter corresponding to the current location information.

In an example, the selection parameter set includes n subsets, where the n is a positive integer; and an i-th subset of the n subsets includes a corresponding relationship between an i-th piece of location information and at least one selection parameter, where the i is a positive integer less than or equal to the n.

In an example, the selection parameter set includes m subsets, where the m is a positive integer; and a k-th subset of the m subsets includes: a corresponding relationship between a k-th selection parameter and at least one piece of location information, where the k is a positive integer less than or equal to the m.

In an example, the selection parameter includes at least one of: a selection parameter for selecting a network equivalent to a home service provider, a selection parameter for selecting a network controlled by a service provider, a selection parameter for selecting a network controlled by a terminal device, a selection parameter for selecting a prioritized network of a home service provider for a SNPN, and a selection parameter for selecting a preferred selection type of a network during roaming.

In an example, the parameter selection module 720 is further configured to, in a case that the selection parameter set does not include the current location information, select, from the selection parameter set, a selection parameter corresponding to default location information. The network selection module 730 is further configured to perform network selection according to the selection parameter corresponding to the default location information.

In an example, the location information includes at least one of the following: a geographic location, or an MCC.

In an example, the selection parameter set is carried in a SIM card of the terminal device.

Figure 8:
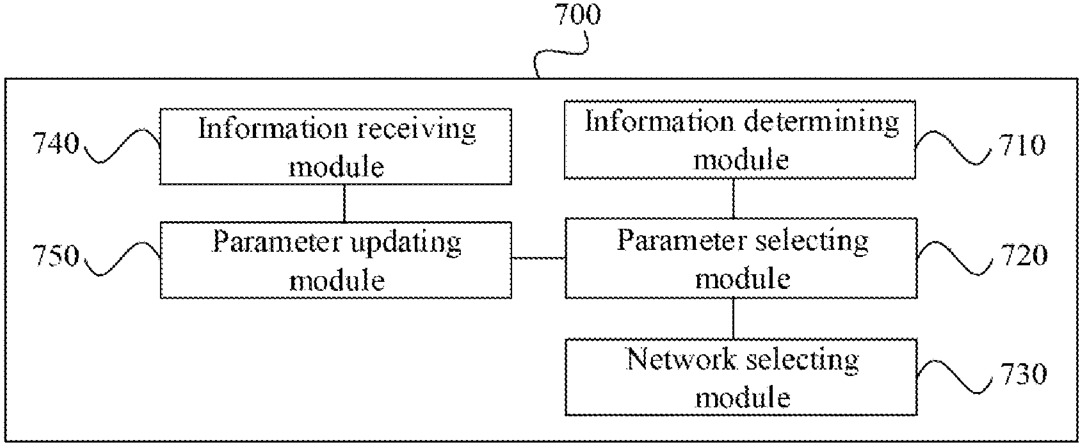
FIG. 8 is a block diagram of a network selection apparatus according to another embodiment of the present application.

In an example, as shown in FIG. 8, the apparatus 700 further includes: an information receiving module 740, configured to receive configuration update information from a network device, where the configuration update information is used for indicating that the selection parameter set is updated; and a parameter updating module 750, configured to update the selection parameter set according to the configuration update information.

In an example, the configuration update information is carried in a NAS signaling.

In summary, in the technical solution according to the embodiment of the present application, the terminal device determines a corresponding selection parameter from a selection parameter set according to current location information, and then performs network selection by using the selection parameter, so that the terminal device flexibly determines the selection parameter for network selection based on its location. Moreover, in the embodiment of the present application, the selection parameter set includes the corresponding relationship between the selection parameter and the location information. Compared with the configuration of a single fixed selection list for the terminal device, which cannot meet the demand of the terminal device for flexible network selection, the embodiment of the present application fully considers the network selection preferences of the terminal device at different locations, realizes differential configuration of selection parameters according to different location information, enriches the configuration of selection parameters, and facilitates the terminal device quickly and accurately selecting the network to be accessed.

In addition, in the technical solution according to the embodiment of the present application, in a case that the selection parameter set is updated, the network device sends configuration update information to the terminal device, to notify the terminal device to update the selection parameter set in time, thereby avoiding the subsequent failure to use a new selection parameter or access a new network type. The embodiment of the present application fully considers changes that the terminal device may encounter in the process of network selection, which helps the terminal device effectively determine the selection parameter according to the differentiation of location information in long-term.

Figure 9:
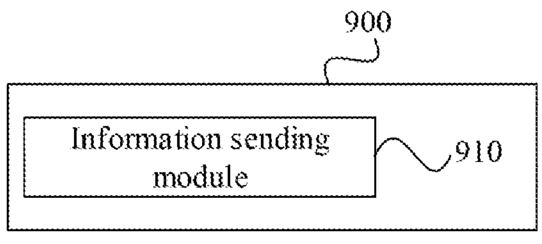
FIG. 9 is a block diagram of a network selection apparatus according to a further embodiment of the present application.

Referring to FIG. 9, it shows a block diagram of a network selection apparatus according to an embodiment of the present application. The apparatus has functions of implementing the above-mentioned method examples of the network device side, and the functions may be implemented by hardware, or by executing corresponding software in hardware. The apparatus may be a network device as described above, or may be provided in a network device. As shown in FIG. 9, the apparatus 900 may include: an information sending module 910.

The information sending module 910 is configured to send configuration update information to a terminal device, where the configuration update information is used for indicating that a selection parameter set is updated, where the selection parameter set includes a corresponding relationship between location information and a selection parameter, and the selection parameter is used for selecting a PLMN or an NPN.

In an example, the configuration update information is carried in a NAS signaling.

In an example, the selection parameter set includes n subsets, where the n is a positive integer; and an i-th subset of the n subsets includes a corresponding relationship between an i-th piece of location information and at least one selection parameter, where the i is a positive integer less than or equal to the n.

In an example, the selection parameter set includes m subsets, where the m is a positive integer; and a k-th subset of the m subsets includes: a corresponding relationship between a k-th selection parameter and at least one piece of location information, where the k is a positive integer less than or equal to the m.

In an example, the selection parameter includes at least one of: a selection parameter for selecting a network equivalent to a home service provider, a selection parameter for selecting a network controlled by a service provider, a selection parameter for selecting a network controlled by a terminal device, a selection parameter for selecting a prioritized network of a home service provider for a SNPN, and a selection parameter for selecting a preferred selection type of a network during roaming.

In an example, the selection parameter set is carried in a SIM card of the terminal device.

In summary, in the technical solution according to the embodiment of the present application, the terminal device determines a corresponding selection parameter from a selection parameter set according to current location information, and then performs network selection by using the selection parameter, so that the terminal device flexibly determines the selection parameter for network selection based on its location. Moreover, in the embodiments of the present application, the selection parameter set includes the corresponding relationship between the selection parameter and the location information. Compared with the configuration of a single fixed selection list for the terminal device, which cannot meet the demand of the terminal device for flexible network selection, the embodiment of the present application fully considers the network selection preferences of the terminal device at different locations, realizes differential configuration of selection parameters according to different location information, enriches the configuration of selection parameters, and facilitates the terminal device quickly and accurately selecting the network to be accessed.

In addition, in the technical solution according to the embodiment of the present application, in a case that the selection parameter set is updated, the network device sends configuration update information to the terminal device, to notify the terminal device to update the selection parameter set in time, thereby avoiding the subsequent failure to use a new selection parameter or access a new network type. The embodiment of the present application fully considers changes that the terminal device may encounter in the process of network selection, which helps the terminal device effectively determine the selection parameter according to the differentiation of location information in long-term.

It should be noted that, the division of the above functional modules is merely used as an example for illustrating the implementation of the functions of the apparatuses according to the above embodiment. In practical applications, the above-mentioned functions may be assigned to different function modules to complete according to actual needs, that is, the content structure of the device is divided into different function modules to complete all or part of the functions described above.

With respect to the apparatus in the above-described embodiment, the specific ways in which various modules perform the operations have been described in detail in the embodiments of the method, which will not be described in detail herein.

Figures 10, 11:
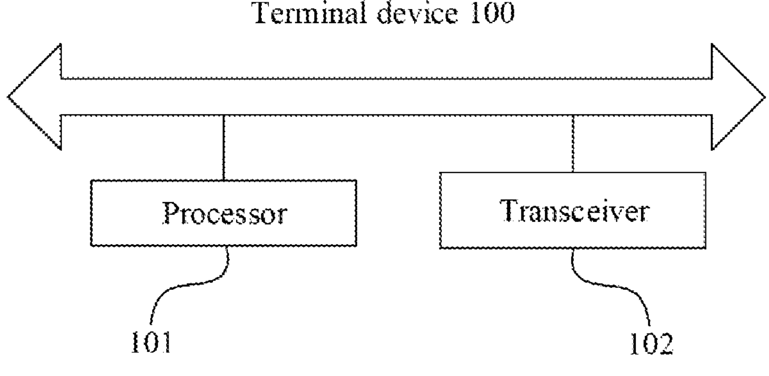
FIG. 10 is a block diagram of a terminal device according to an embodiment of the present application.
FIG. 11 is a block diagram of a network device according to an embodiment of the present application.

Referring to FIG. 10, it shows a structural schematic diagram of a terminal device 100 according to an embodiment of the present application. For example, the terminal device may be used to execute the above-mentioned network selection method of the terminal device side. Specifically, the terminal device 100 may include: a processor 101, and a transceiver 102 connected to the processor 101; where:

- the processor 101 includes one or more processing cores, and the processor 101 performs various functional applications and information processing by running a software program and a module; and
- the transceiver 102 includes a receiver and a transmitter; in an implementation, the transceiver 102 is a communication chip.

In an example, the terminal device 100 further includes: a memory and a bus. The memory is connected to the processor via the bus. The memory may be used to store a computer program, and the processor is configured to execute the computer program, to implement the various steps performed by the terminal device in the method embodiment described above.

In addition, the memory may be implemented by any type of volatile or non-volatile storage device or a combination thereof. The volatile or non-volatile storage device includes, but not limited to, a RAM (Random-Access Memory) and a ROM (Read-Only Memory), an EPROM (Erasable Programmable Read-Only Memory), an EEPROM (Electrically Erasable Programmable Read-Only Memory), a flash memory or other solid state storage technologies, a CD-ROM (Compact Disc Read-Only Memory), a DVD (Digital Video Disc) or other optical storages, a tape cartridge, a magnetic tape, a disk storage or other magnetic storage devices. Where:

- the processor 101 is configured to determine current location information of the terminal device;
- the processor 101 is further configured to select, from a selection parameter set, a selection parameter corresponding to the current location information, where the selection parameter set includes a corresponding relationship between the location information and the selection parameter, and the selection parameter is used for selecting a PLMN or an NPN; and
- the processor 101 is further configured to perform network selection according to the selection parameter corresponding to the current location information.

In an example, the selection parameter set includes n subsets, where the n is a positive integer; and an i-th subset of the n subsets includes a corresponding relationship between an i-th piece of location information and at least one selection parameter, where the i is a positive integer less than or equal to the n.

In an example, the selection parameter set includes m subsets, where the m is a positive integer; and a k-th subset of the m subsets includes: a corresponding relationship between a k-th selection parameter and at least one piece of location information, where the k is a positive integer less than or equal to the m.

In an example, the selection parameter includes at least one of: a selection parameter for selecting a network equivalent to a home service provider, a selection parameter for selecting a network controlled by a service provider, a selection parameter for selecting a network controlled by a terminal device, a selection parameter for selecting a prioritized network of a home service provider for a SNPN, and a selection parameter for selecting a preferred selection type of a network during roaming.

In an example, the processor 101 is further configured to, in a case that the selection parameter set does not include the current location information, select, from the selection parameter set, a selection parameter corresponding to default location information; and perform network selection according to the selection parameter corresponding to the default location information.

In an example, the location information includes at least one of the following: a geographic location, or an MCC.

In an example, the selection parameter set is carried in a SIM card of the terminal device.

In an example, the transceiver 102 is configured to receive configuration update information from a network device, where the configuration update information is used for indicating that the selection parameter set is updated; and the processor 101 is further configured to update the selection parameter set according to the configuration update information.

In an example, the configuration update information is carried in a NAS signaling.

Referring to FIG. 11, it shows a structural schematic diagram of a network device 110 according to an embodiment of the present application. For example, the network device may be used to execute the above-mentioned network selection method of the network device side. Specifically, the network device 110 may include: a processor 111, and a transceiver 112 connected to the processor 111; where:

- the processor 111 includes one or more processing cores, and the processor 111 performs various functional applications and information processing by running a software program and a module; and
- the transceiver 112 includes a receiver and a transmitter; in an implementation, the transceiver 112 is a communication chip.

In an example, the network device 110 further includes: a memory and a bus. The memory is connected to the processor via the bus. The memory may be configured to store a computer program, and the processor is configured to execute the computer program, to implement the various steps performed by the network device in the method embodiment described above.

In addition, the memory may be implemented by any type of volatile or non-volatile storage device or a combination thereof. The volatile or non-volatile storage device includes, but not limited to, a RAM and a ROM, an EPROM, an EEPROM, a flash memory or other solid state storage technologies, a CD-ROM, a DVD or other optical storages, a tape cartridge, a magnetic tape, a disk storage or other magnetic storage devices. where:

the transceiver 112 is configured to send configuration update information to a terminal device, where the configuration update information is used for indicating that a selection parameter set is updated, where the selection parameter set includes a corresponding relationship between location information and a selection parameter, and the selection parameter is used for selecting a PLMN or an NPN.

In an example, the configuration update information is carried in a NAS signaling.

In an example, the selection parameter set includes n subsets, where the n is a positive integer; and an i-th subset of the n subsets includes a corresponding relationship between an i-th piece of location information and at least one selection parameter, where the i is a positive integer less than or equal to the n.

In an example, the selection parameter set includes m subsets, where the m is a positive integer; and a k-th subset of the m subsets includes: a corresponding relationship between a k-th selection parameter and at least one piece of location information, where the k is a positive integer less than or equal to the m.

In an example, the selection parameter includes at least one of: a selection parameter for selecting a network equivalent to a home service provider, a selection parameter for selecting a network controlled by a service provider, a selection parameter for selecting a network controlled by a terminal device, a selection parameter for selecting a prioritized network of a home service provider for a SNPN, and a selection parameter for selecting a preferred selection type of a network during roaming.

In an example, the selection parameter set is carried in a SIM card of the terminal device.

An embodiment of the present application further provides a computer readable storage medium, having a computer program stored therein, where the computer program is used to be executed by a processor of a terminal device, to implement the above-mentioned network selection method of the terminal device side.

An embodiment of the present application further provides a computer readable storage medium, having a computer program stored therein, where the computer program is used to be executed by a processor of a network device, to implement the above-mentioned network selection method of the network device side.

An embodiment of the present application further provides a chip, where the chip includes a programmable logic circuit and/or program instructions, and the chip, when running on a terminal device, is configured to implement the above-mentioned network selection method of the terminal device side.

An embodiment of the present application further provides a chip, where the chip includes a programmable logic circuit and/or program instructions, and the chip, when running on a network device, is configured to implement the above-mentioned network selection method of the network device side.

An embodiment of the present application further provides a computer program product, where the computer program product, when run on a terminal device, causes a computer to execute the above-mentioned network selection method of the terminal device side.

An embodiment of the present application further provides a computer program product, where the computer program product, when run on a network device, causes a computer to execute the above-mentioned network selection method of the network device side.

Persons of ordinary skill in the art may be aware of that, in one or more of the above examples, the functions described in the embodiments of the present application may be implemented by hardware, software, firmware, or any combination thereof. When implemented using software, the functions may be stored in a computer-readable medium or transmitted as one or more instructions or codes on a computer-readable medium. The computer-readable medium includes a computer storage medium and a communication medium, where the communication medium includes any medium that facilitates the transmission of a computer program from one place to another. The storage medium may be any available medium that can be accessed by a general computer or a special computer.

The foregoing are only illustrative embodiments of the present application and are not intended to limit the present application. Any modification, equivalent substitution, improvement and others that are made within the spirit and principle of the present application shall be included in the protection scope of the present application.

What is claimed is:

1. A network selection method, applied to a terminal device, the method comprising:

determining current location information of the terminal device;

selecting, from a selection parameter set, a selection parameter corresponding to the current location information, wherein the selection parameter set comprises a corresponding relationship between the location information and the selection parameter, and the selection parameter is used for selecting a non-public network (NPN); and performing network selection according to the selection parameter corresponding to the current location information;

wherein the selection parameter comprises a selection parameter for selecting a prioritized network of a home service provider for a standalone NPN (SNPN);

wherein the method further comprises:

receiving configuration update information from a network device, wherein the configuration update information is used for indicating that the selection parameter set is updated; and updating the selection parameter set according to the configuration update information.

2. The method according to claim 1, wherein the selection parameter set comprises n subsets, the n is a positive integer; and an i-th subset of the n subsets comprises a corresponding relationship between an i-th piece of location information and at least one selection parameter, wherein the i is a positive integer less than or equal to the n.

3. The method according to claim 1, wherein after the determining the current location information of the terminal device, the method further comprises:

in a case that the selection parameter set does not comprise the current location information, selecting, from the selection parameter set, a selection parameter corresponding to default location information; and performing network selection according to the selection parameter corresponding to the default location information.

4. The method according to claim 1, wherein the selection parameter set is carried in a subscriber identity module (SIM) card of the terminal device.

5. The method according to claim 1, wherein the configuration update information is carried in a non-access stratum (NAS) signaling.

6. The method according to claim 1, wherein the selection parameter set comprises m subsets, the m is a positive integer; and a k-th subset of the m subsets comprises: a corresponding relationship between a k-th selection parameter and at least one piece of location information, wherein the k is a positive integer less than or equal to the m.

7. The method according to claim 1, wherein the location information comprises at least one of: a geographic location, or a mobile country code (MCC).

8. A network selection apparatus, provided in a terminal device, the apparatus comprising:

at least one processor; and a memory communicatively connected to the at least one processor; wherein, the memory stores instructions executable by the at least one processor, and the instructions are executed by the at least one processor, so that the at least one processor is configured to:

determine current location information of the terminal device;

select, from a selection parameter set, a selection parameter corresponding to the current location information, wherein the selection parameter set comprises a corresponding relationship between the location information and the selection parameter, and the selection parameter is used for selecting a non-public network (NPN); and perform network selection according to the selection parameter corresponding to the current location information;

wherein the selection parameter comprises a selection parameter for selecting a prioritized network of a home service provider for a standalone NPN (SNPN);

wherein the at least one processor is further configured to:

receive configuration update information from a network device, wherein the configuration update information is used for indicating that the selection parameter set is updated; and update the selection parameter set according to the configuration update information.

9. The apparatus according to claim 8, wherein the selection parameter set comprises n subsets, the n is a positive integer; and an i-th subset of the n subsets comprises a corresponding relationship between an i-th piece of location information and at least one selection parameter, wherein the i is a positive integer less than or equal to the n.

10. The apparatus according to claim 8, wherein the at least one processor is further configured to:

in a case that the selection parameter set does not comprise the current location information, select, from the selection parameter set, a selection parameter corresponding to default location information; and perform network selection according to the selection parameter corresponding to the default location information.

11. The apparatus according to claim 8, wherein the location information comprises at least one of: a geographic location, or a mobile country code (MCC).

12. The apparatus according to claim 8, wherein the selection parameter set is carried in a subscriber identity module (SIM) card of the terminal device.

13. The apparatus according to claim 8, wherein the configuration update information is carried in a non-access stratum (NAS) signaling.

14. The apparatus according to claim 8, the selection parameter set comprises m subsets, the m is a positive integer; and a k-th subset of the m subsets comprises: a corresponding relationship between a k-th selection parameter and at least one piece of location information, wherein the k is a positive integer less than or equal to the m.

* * * * *